(12) United States Patent
Cronin et al.

(10) Patent No.: US 9,736,311 B1
(45) Date of Patent: Aug. 15, 2017

(54) RICH MEDIA INTERACTIVE VOICE RESPONSE

(71) Applicant: Rich Media Ventures, LLC, Miami, FL (US)

(72) Inventors: John Cronin, Bonita Springs, FL (US); Neil Balthaser, Montreal (CA)

(73) Assignee: RICH MEDIA VENTURES, LLC, Miami, FL (US)

( * ) Notice: Subject to any disclaimer, the term of this patent is extended or adjusted under 35 U.S.C. 154(b) by 0 days.

(21) Appl. No.: 15/142,053

(22) Filed: Apr. 29, 2016

(51) Int. Cl.
  *H04M 11/00* (2006.01)
  *H04M 3/533* (2006.01)
  *H04M 3/53* (2006.01)
  *H04M 7/00* (2006.01)

(52) U.S. Cl.
  CPC ..... *H04M 3/53333* (2013.01); *H04M 3/5307* (2013.01); *H04M 7/0048* (2013.01); *H04M 7/0054* (2013.01); *H04M 2203/2072* (2013.01)

(58) Field of Classification Search
  CPC .......................... H04M 3/53333; H04M 3/5307
  USPC ........................................................ 379/88.13
  See application file for complete search history.

(56) References Cited

U.S. PATENT DOCUMENTS

| | | | |
|---|---|---|---|
| 6,014,427 A * | 1/2000 | Hanson | H04M 3/533 379/67.1 |
| 6,553,361 B1 | 4/2003 | Compton et al. | |
| 6,763,226 B1 | 7/2004 | McZeal, Jr. | |
| 7,212,614 B1 * | 5/2007 | Burg | G06Q 30/0225 348/468 |
| 7,848,765 B2 | 12/2010 | Phillips et al. | |
| 8,001,471 B2 | 8/2011 | Shaver et al. | |
| 8,095,648 B2 | 1/2012 | MacLeod et al. | |
| 8,296,383 B2 | 10/2012 | Lindahl | |
| 8,307,092 B2 | 11/2012 | Svendsen | |
| 8,554,600 B2 | 10/2013 | Reisman | |
| 8,615,596 B1 | 12/2013 | Upadhyay et al. | |
| 8,706,091 B2 * | 4/2014 | Baird | H04L 12/58 379/67.1 |
| 8,897,760 B1 | 11/2014 | Nasserbakht et al. | |
| 8,924,335 B1 | 12/2014 | Trefler et al. | |
| 9,053,124 B1 | 6/2015 | Dornquast et al. | |
| 2002/0015042 A1 | 2/2002 | Robotham et al. | |
| 2003/0126613 A1 | 7/2003 | McGuire | |
| 2003/0157968 A1 | 8/2003 | Boman et al. | |
| 2005/0125717 A1 | 6/2005 | Segal et al. | |

(Continued)

OTHER PUBLICATIONS

U.S. Appl. No. 15/142,018, John Cronin, Common and Transportable Rich Media Controller, filed Apr. 29, 2016.

(Continued)

*Primary Examiner* — Van D Huynh
(74) *Attorney, Agent, or Firm* — Polsinelli LLP

(57) ABSTRACT

The systems and methods are directed towards embodiments for implementing an interactive voice response (IVR) system with the voicemail system. The combination of the two systems would allow the recipient to listen to a recorded voicemail message and receive associated IVR commands that can be provided by the sender. The IVR commands allow the sender to generate customized IVR commands that provides different types of rich media based information (e.g., hyperlinks, video files, audio files) based on the sender input. Other systems and methods are also directed towards embedding active content (i.e. rich media based content) into documents.

15 Claims, 12 Drawing Sheets

(56) References Cited

U.S. PATENT DOCUMENTS

| | | |
|---|---|---|
| 2005/0256941 A1 | 11/2005 | Armstrong et al. |
| 2006/0123080 A1 | 6/2006 | Baudino et al. |
| 2006/0139312 A1 | 6/2006 | Sinclair et al. |
| 2006/0143307 A1* | 6/2006 | Codignotto .......... G06Q 10/107 709/246 |
| 2007/0152058 A1 | 7/2007 | Yeakley et al. |
| 2007/0266170 A1 | 11/2007 | Mockett |
| 2008/0066129 A1 | 3/2008 | Katcher et al. |
| 2008/0091175 A1 | 4/2008 | Frikart et al. |
| 2009/0222709 A1 | 9/2009 | Lin et al. |
| 2009/0270170 A1 | 10/2009 | Patton |
| 2009/0299840 A1 | 12/2009 | Smith |
| 2010/0057785 A1 | 3/2010 | Khosravy et al. |
| 2010/0198880 A1 | 8/2010 | Petersen |
| 2011/0208616 A1 | 8/2011 | Gorman et al. |
| 2011/0208822 A1 | 8/2011 | Rathod |
| 2011/0208831 A1 | 8/2011 | Ho et al. |
| 2012/0070129 A1 | 3/2012 | Lin et al. |
| 2012/0072936 A1 | 3/2012 | Small et al. |
| 2012/0143693 A1 | 6/2012 | Chung et al. |
| 2012/0167001 A1 | 6/2012 | Ortiz et al. |
| 2012/0232906 A1 | 9/2012 | Lindahl |
| 2012/0239417 A1 | 9/2012 | Pourfallah et al. |
| 2013/0166372 A1 | 6/2013 | Abraham et al. |
| 2013/0260350 A1 | 10/2013 | Kutty et al. |
| 2013/0290234 A1 | 10/2013 | Harris et al. |
| 2014/0019352 A1 | 1/2014 | Shrivastava |
| 2014/0188803 A1 | 7/2014 | James et al. |
| 2014/0214429 A1 | 7/2014 | Pantel |
| 2014/0323817 A1 | 10/2014 | el Kaliouby et al. |
| 2015/0092520 A1 | 4/2015 | Robison et al. |
| 2015/0106221 A1 | 4/2015 | Tapley et al. |
| 2015/0128058 A1 | 5/2015 | Anajwala |
| 2015/0156028 A1 | 6/2015 | Ballard et al. |
| 2015/0178511 A1 | 6/2015 | Klappert et al. |
| 2015/0186533 A1 | 7/2015 | Patil et al. |
| 2015/0199961 A1 | 7/2015 | Arkko et al. |
| 2015/0253885 A1 | 9/2015 | Kagan et al. |
| 2015/0309702 A1 | 10/2015 | Butler et al. |
| 2016/0037251 A1 | 2/2016 | Daniels |
| 2016/0165387 A1 | 6/2016 | Nhu |

OTHER PUBLICATIONS

U.S. Appl. No. 15/142,033, John Cronin, Rich Media Integration With User Devices, filed Apr. 29, 2016.

U.S. Appl. No. 15/142,038, John Cronin, Rich Media Video Stream, filed Apr. 29, 2016.

U.S. Appl. No. 15/142,046, John Cronin, Rich Media Aggregated Communications Journal, filed Apr. 29, 2016.

U.S. Appl. No. 15/142,350, John Cronin, Active Content Rich Media Using Intelligent Personal Assistant Applications, filed Apr. 29, 2016.

U.S. Appl. No. 15/142,372, John Cronin, Customized Rich Media Viewer, filed Apr. 29, 2016.

U.S. Appl. No. 15/142,055, John Cronin, Intelligent Personal Assistant for E-Mail Partner, filed Apr. 29, 2016.

U.S. Appl. No. 15/142,100, John Cronin, Rich Media Interfaces to Biosensors Wearable Device System, filed Apr. 29, 2016.

U.S. Appl. No. 15/142,038 Office Action mailed Jul. 27, 2016.

U.S. Appl. No. 15/142,350 Office Action mailed Jul. 15, 2016.

U.S. Appl. No. 15/142,100 Office Action mailed Jul. 26, 2016.

U.S. Appl. No. 15/142,046 Office Action mailed Aug. 8, 2016.

U.S. Appl. No. 15/142,038 Final Office Action mailed Jan. 27, 2017.

U.S. Appl. No. 15/142,350 Final Office Action mailed Jan. 25, 2017.

U.S. Appl. No. 15/142,100 Final Office Action mailed Jan. 31, 2017.

Naftali, M. et al.; "Accessibility in context: understanding the truly mobile experience of smartphone users with motor impairments." In Proceedings of the 16th international ACM SIGACCESS conference on Computers & accessibility (pp. 209-216). ACM. DOI: 10.1145/2661334.2661372 (Oct. 2014).

Raveendran, V. et al.; "Speech only interface approach for personal computing environment." In Engineering and Technology (ICETECH), 2016 IEEE International Conference on (p. 372-377). IEEE. DOI: 10.1109/ICETECH.2016.7569279 (Mar. 2016).

Sobeth, T. et al.; "DIVINE: Building a Wearable Device for Intelligent Control of Environment Using Google Glass." Computer and Information Technology; Ubiquitous Computing and Communications; Dependable, Autonomic and Secure Computing; Pervasive Intelligence and Computing; Pervasive Intelligence and Computing (CIT/UCC/DASC/PICOM), 2015 IEEE International Conference on Computer and Information Technology. (Oct. 2015).

Valizadeh, E.; "A Survey of Smartwatch Platforms from a Developer's Perspective." (Apr. 2015).

U.S. Appl. No. 15/142,372 Office Action mailed Dec. 13, 2016.

U.S. Appl. No. 15/142,033 Office Action mailed Dec. 30, 2016.

U.S. Appl. No. 15/142,046 Final Office Action mailed Dec. 27, 2016.

U.S. Appl. No. 15/142,055 Office Action mailed Nov. 4, 2016.

* cited by examiner

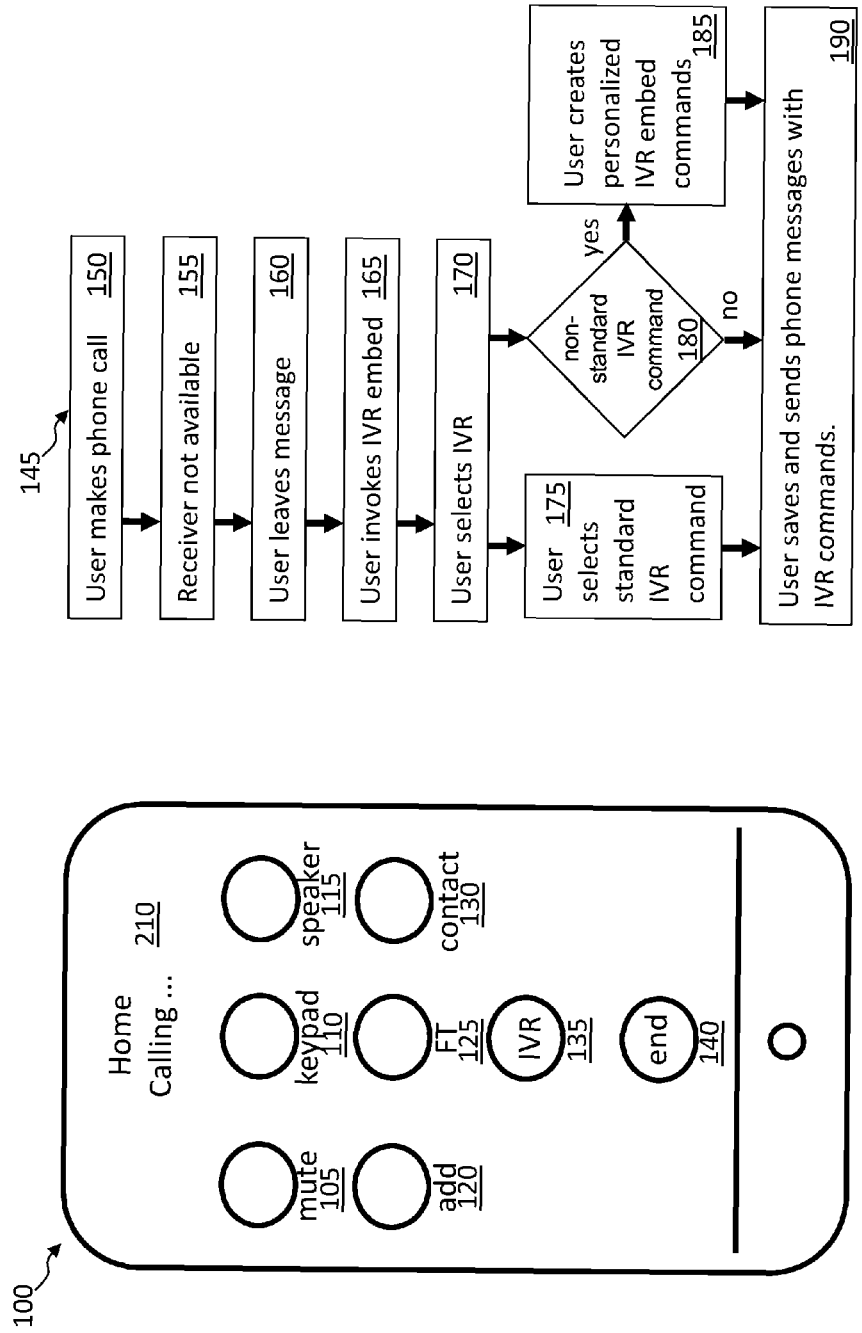

IVR Commands

Standard Commands 205

1. Send Voice Mail direct to my voice box  210
2. Jump to SMS and send me TEXT  215
3. Jump to email and send me email  220
4. Set a reminder to call back later  225
5. Embed voice mail in an open email  230

Custom Commands 250

6. Jump to the hyperlink <https://USAtoday.com/1151>  255
7. Download Archived File <https://dropbox.com/JxLLC/F67.doc>  260
8. Call suggested party 617-344-1721  265
9. Insert calendar request <Cal/June 18/13:00/Lunch with JxLLC>  270
10. Add me to your contacts <Contacts/VCF>  275

FIG. 2

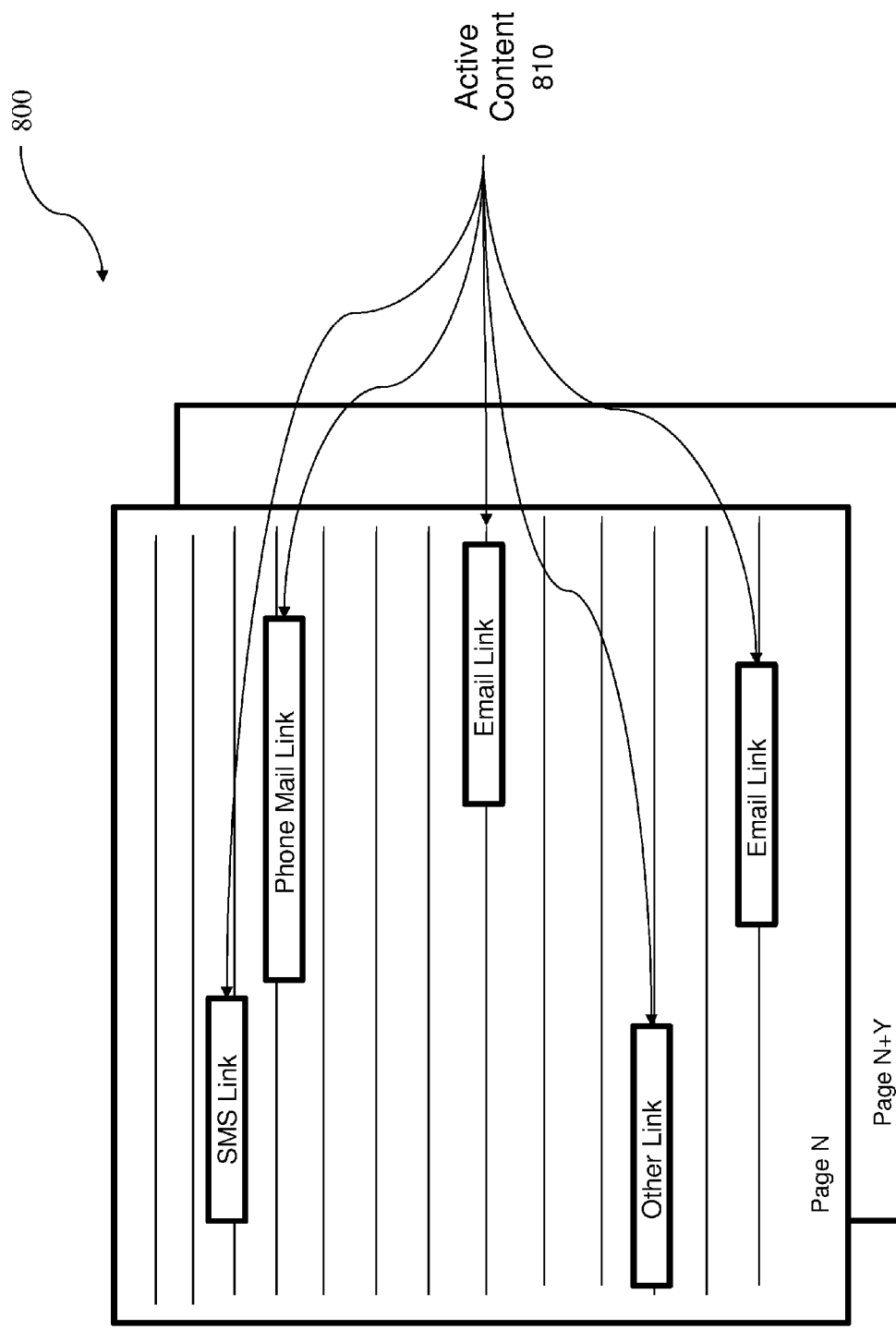

RICH MEDIA INTERACTIVE VOICE RESPONSE

BACKGROUND OF THE INVENTION

1. Field of Technology

The present disclosure generally relates to rich media. More specifically, the present disclosure relates to rich media being incorporated into an interactive voice response.

2. Description of the Related Art

Interactive voice response (IVR) refers to an area of technology that allows computers to interact with individuals through the use of voice and dual-tone multi-frequency (DTMF) signaling via a keypad. IVR allows users to interact, for example, with a company's host system via telephone keypad or speech recognition. Examples of implemented IVR technology are available where companies (e.g., telephone, banking, credit card services) provide a way for customers to obtain customer service. The customers who call in can often obtain their requested information through the use of IVR. The IVR allows the company's host system to query, search and provide particular information based on the customer's input. In situations where the requested information is not found, the customer can subsequently be transferred to a live agent.

Voice mail is a computer-based system that allows users and subscribers to exchange personal voice mail messages, to select and deliver voice information, and to process transactions relating to individuals, organizations, products and services using a telephone. Generally, the term is related to a system that is used to convey stored voice mail messages. These voice mail messages may be stored on devices (e.g., answering machines, cellphones), mail servers, computer systems/networks, or in the cloud/Internet to be later accessed by the recipient of the voice mail message.

Voicemail is applicable in situations, for example, where a first individual attempts to contact a second individual who is currently unavailable. The voicemail allows the first individual to leave an audio recording containing a short message that the second individual (i.e. recipient) can access and listen to at a later time. The voicemail messages may various types of information such as summary of why the call was made or to inform the second individual to contact the first individual when available.

Presently, the features that can be used alongside voice mail messages are limited. Such features include calling the sender of the voice mail back and managing (i.e. saving, deleting) the voice mail file. There is a need for additional functionalities that can be incorporated for use with voice mail.

SUMMARY OF THE CLAIMED INVENTION

A method for incorporating an interactive voice response (IVR) system with a voice mail system is presently claimed. The method begins with a generated voice mail message that is created for a recipient from a sender. After the voice mail message has been recorded, the sender enables IVR functionality with the voice mail message by selecting one or more IVR commands to be associated with the voice mail message. A menu listing all the selected IVR commands is generated and associated with the voice mail message. This menu is displayed for the recipient when the recipient accesses/listens to the voice mail message. Once all the IVR commands have been selected by the sender, the voicemail message and corresponding IVR menu are saved for when the recipient accesses the voice mail message.

A method for accessing the voice mail messages that include IVR commands is also claimed. The recipient accesses the stored voice mail message using a user device (e.g., smartphone, cellphone, laptop). The stored voice mail message includes at least one IVR command selected by the sender. When the recipient accesses/listens to the voice mail message, an IVR menu is also displayed on the user device. The IVR menu displays all associated IVR commands selected by the sender. The recipient is able to select one or more IVR commands from the IVR menu. Based on the selected IVR command, a corresponding action is performed.

A method for utilizing active content embedded in active content documents is also claimed. Example active content documents include various text-based documents such as e-mails, text-messages and e-books. The method includes first downloading the document that includes embedded active content links to the user device. The user device includes active content software capable of accessing the active content links. The active content links correspond to active content files that may be stored on the user device or within networks found on the cloud/Internet. These active content files may include rich media-based content such as hyperlinks, audio files, video files, text-based files (e.g., e-mails, text messages, Word documents), spreadsheets and PDFs. The active content software retrieves and displays active content files associated with user selected embedded active content links within the document.

BRIEF DESCRIPTION OF THE DRAWINGS

FIG. 1A illustrates a cellphone that incorporates the interactive voice response (IVR) system.

FIG. 1B illustrates a method for utilizing the IVR system with the voicemail.

FIG. 2 illustrates exemplary IVR commands that can be associated with a voice mail message.

FIG. 8A and FIG. 8B illustrate example active content that includes various different types of embedded content.

DETAILED DESCRIPTION

Figure 3:
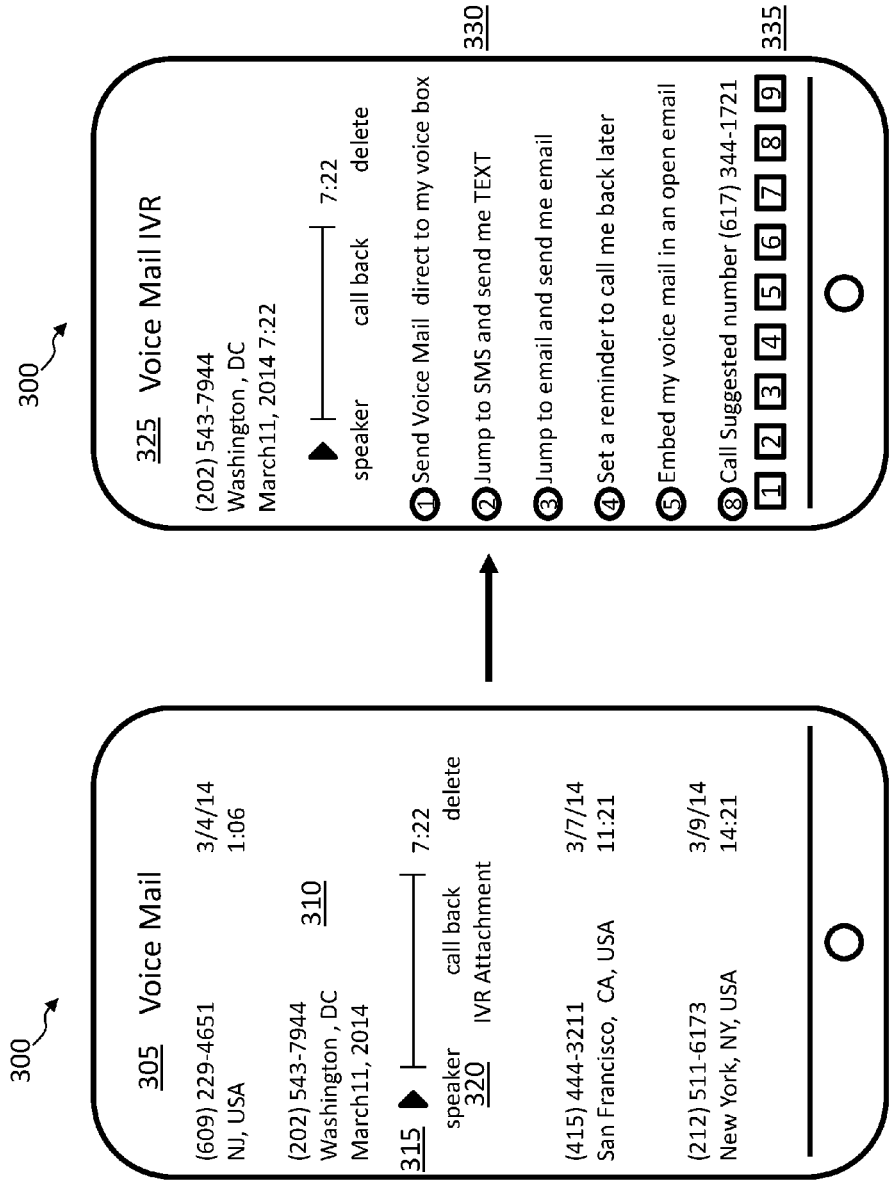
FIG. 3 illustrates s cellphone that includes the IVR system with voice mail messages.

The systems and methods of the present application are directed towards implementing an interactive voice response (IVR) system with the voicemail system. The combination of the two systems would allow the recipient to listen to a recorded voicemail message and receive associated IVR commands that can be provided by the sender. The IVR commands allow the sender to generate customized IVR commands that provides different types of rich media based information (e.g., hyperlinks, video files, audio files) based on the sender input. For example, a recipient can obtain a hyperlink (provided by the sender) by inputting into the telephone the corresponding IVR command that retrieves the hyperlink. Documents (e.g., text-based documents, audio files) can also be transmitted to the recipient upon request.

In another embodiment, the systems and methods of the present application also facilitate embedding the actual voice mail message into documents (i.e. messages such as texts and e-mail) provided by the sender to the recipient. This allows the sender to more efficiently reference a previously provided voice mail message for the recipient. This feature would facilitate providing the actual voice mail message to the recipient without the need for applications that would typically process and translate the voicemail into a format that can be embedded (e.g., .wav file).

Rich media, as used in the present disclosure, refers to content that may include text (i.e. words) or images (i.e. pictures) to convey information to the user, but may also include or utilize a variety of advanced features such as video and audio that encourages viewers to interact and engage with the content being viewed. The content discussed herein may include a variety of rich media, as well as traditional text or image content. Rich media may be included, for example, in a webpage advertisement that uses advanced technology such as streaming video and downloaded applications. The use of the advanced technology with the webpage advertisement allows and encourages users to interact with the content being displayed.

FIG. 1A illustrates a cellphone 100 that incorporates the interactive voice response (IVR) system. In particular the IVR system is used in conjunction with a voicemail system in order to provide recipients with the ability to obtain various rich media content provided by the sender.

The cellphone 100 may be any existing computing device (e.g., smartphone) capable of making and receiving telephone calls. The cellphone 100 may include various other functionalities such as text messaging, Internet access, e-mail, running applications, gaming and photography. These functionalities may be displayed on a display of the cellphone 100. In some embodiments, the user (i.e. sender of the voice mail message) is capable of initiating one or more of the functionalities by interacting with a button displayed associated with the corresponding functionality. For example, the display of the cellphone 100 may be a touch-screen display. Therefore, the sender would be capable of making physical contact with the display screen of the cellphone 100 that can then be processed with the associated button displayed on the cellphone 100 to initiate the particular functionality. In other embodiments, the sender may utilize a cursor to indicate what functionality should be initiated. The cursor may be directed, for example, using directional buttons on the cellphone 100 that would allow the sender to navigate where the cursor should be situated by. Once the cursor is within proximity of a particular button, the sender may initiate an action button that indicates to the cellphone 100 that the sender wishes to initiate the corresponding functionality associated but the button near the current position of the cursor. Other methods of indicating what functionality should be initiated by the cellphone 100 are also possible.

As illustrated in the figure, the cellphone 100 has a number of buttons (e.g., 105-140) that the sender can interact with (e.g., touch) in order to initiate various different types of processes to be performed by the cellphone 100. For example, the cellphone 100 may include a mute button 105 (used to mute a phone call), keypad button 110 (to enable a virtual keypad on the cellphone 100 display screen), speaker button 115 (to enable speaker mode for the phone call), add button 120 (to allow the sender to add information during the phone call), face time (FT) button 125 (to allow the sender to turn the phone call into a video chat session), contact button 130 (to allow the sender to view the contact information of the other individual in the phone call, and an end button 140 (to allow the sender to end the phone call). These functionalities are generally available on various smartphones currently in the market and widely used today.

With respect to the present application, the cellphone 100 includes a novel feature labeled in FIG. 1A as an IVR button 135. The IVR button 135 would allow the sender to embed IVR commands to a voicemail being left for the recipient. In this way, the sender is capable of providing rich media content for the recipient. Further details regarding how the IVR button 135 would be used is provided below in FIG. 1B.

FIG. 1B illustrates a method 145 for utilizing the IVR system with the voicemail. The IVR system is implemented during a phone call where the sender is leaving a voicemail for the recipient. The IVR system can be invoked, for example, via sender interaction with the IVR button 135 of the cellphone 100 described above in FIG. 1A.

The method 145 involves the sender first making a phone call with a particular recipient (step 150). Generally, phone calls involve ordinary voice transmission using telephone/cellphones (or computing devices such as smartphones). The phone call itself may utilize land lines, cellular networks, and/or satellites.

In step 155, the sender may determine that the recipient of the phone call is currently unavailable. This may correspond with the recipient not answering the phone call initiated by the sender. In many embodiments, when a phone call is initiated, a tone (or ring) is provided to indicate that the phone call is currently attempting to connect the sender with the designated recipient. For as long as the sender is attempting connection with the recipient, the tone (or ring) is provided. It may be possible, however, that after a predetermined number of attempts (e.g., after four rings), a voice message system is initiated on behalf of the recipient. The voice message system allows the sender to leave a voice-recorded message (also referred to as a voice mail or voice mail message) that can be later accessed by the recipient.

In step 160, the sender leaves the recipient a voice-recorded message to be stored with the voice message system. The voice mail message may include information for the recipient such as identifying the reason for the call, who initiated the call and contact information for calling back.

The voice mail message that is left by the sender is stored, for example, on a device that the recipient can later access to retrieve the voice mail message. For example, the voice mail message may be recorded and stored on an answering machine. Nowadays, the voice mail message may be stored on the cellphone/smartphone of the recipient. In some embodiments, the voice mail message can be stored in the cloud/Internet associated with the recipient (i.e. user account).

In step 165, the sender can incorporate IVR commands with the voice mail message being provided to the recipient. As noted above, the IVR functionalities can be initiated via sender input (e.g., IVR button 135 associated with the cellphone 100). Once the IVR functionalities have been initiated, the sender is allowed to select among various IVR commands to be incorporated into the voice mail message (step 170). The IVR commands may include standard IVR commands 175 that are generally available to everyone utilizing the IVR system. The IVR commands may also include non-standard (or custom) commands 180 that are generated by the sender (in step 185). Exemplary IVR commands are described below in FIG. 2.

Once all the desired IVR commands have been incorporated with the voice mail message, the sender can then save the association of the IVR commands with the voice mail message for the recipient. The voice mail message with the associated IVR commands provided by the sender can then be provided to the recipient when the recipient accesses the voice mail message.

FIG. 2 illustrates exemplary IVR commands 205, 250 that can be associated with a voice mail message. As referenced above in FIG. 1B, the sender may select various IVR commands (in steps 175 and 180) to associate with the voice mail message. When the recipient accesses the voice mail message, the recipient may also be provided the sender selected IVR commands that can be selected via recipient's interaction with, for example, the recipient's cellphone. Descriptions of the various standard IVR commands 205 and custom commands 250 are provided below.

Some exemplary standard commands 205 are illustrated in FIG. 2. These standard commands 205 may be commands available for all senders associated with the IVR system. In other words, any sender can have access to these standard commands 205 and incorporate these commands into the voice mail message to be provided to the recipient.

IVR command 210 may allow the recipient to automatically save the voice mail message to their inbox associated with, for example, the recipient's cell phone. There may be situations where the voice mail message is not automatically stored on the recipient's cellphone (i.e. stored on an online server or another voice mail message-related device). The recipient may wish to download and store the voice mail message to their cell phone for future reference.

IVR command 215 may allow the recipient to receive a text message (via short messaging service) associated with the voice mail message. The text message may be a summary of the voice mail message provided by the sender. This text message may be generated, for example, by the sender and associated with the voice mail message. In some situations, the recipient may wish to receive a shorthand summary of the voice mail message via text message instead of listening to the whole entire voice mail message. In other situations, the recipient may be capable of receiving information (e.g., return call number, address) raised in the voice mail message.

The IVR command 215 may also allow the recipient to respond to the voice mail message with a text message. The text message from the recipient may automatically be fill in information pertaining to the recipient of the text message as the sender of the voice mail message. In this way, the recipient can more easily respond to the voice mail message without needing to figure out who the voice mail message is from or looking up contact information for the sender of the voice mail message if it was not initially provided. In some embodiments, the voice mail message may be embedded within the text of the text message. Further details regarding the embedding functionality of voice mail messages in text messages can be found below (e.g., FIGS. 7-9).

IVR command 220 may allow the recipient to receive an e-mail associated with the voice mail message. Similar to the text message that may be provided with IVR command 215, the e-mail that is provided to the recipient may be a summary of the voice mail message provided by the sender. To enable receipt of the e-mail, the sender and/or the recipient would need to provide information regarding as to where the e-mail is to be sent. For example, the sender (i.e. individual leaving the voice mail) may know the e-mail of the recipient. Upon selection of IVR command 220, an e-mail can be sent to the recipient's e-mail address in a similar manner as described above associated with the text message via SMS service.

Similar to IVR command 215, IVR command 220 may also allow the recipient to automatically generate a new e-mail that is addressed to the sender of the voice mail message. In this way, the recipient of the voice mail message can more easily respond to the voice mail message without figuring out who the sender of the voice mail message is or finding the contact information for the sender. In some embodiments, the voice mail message may be saved as an attachment. In other embodiments, the voice mail message can be embedded within the text of the e-mail. Further details regarding the embedding functionality of voice mail messages in e-mail can be found below (e.g., FIGS. 7-9).

IVR command 225 allows the recipient to set a reminder to contact the sender of the voice mail message at a later date. In situations where the recipient of the voice mail message is only listening to and not following up on voice mail messages, this command 225 may instruct an associated calendar application to set up an appointment/reminder informing the recipient to follow up the voice mail message with the sender. The IVR command 225 may provide the contact information (e.g., name, phone number, e-mail address) of the sender in the generated contact/reminder for future reference.

IVR command 230 may allow the recipient to generate a new e-mail and incorporate the voice mail message into the generated e-mail. The voice mail message may be processed and translated into a file type (e.g., .wav) that can be played on various computing devices (e.g., smartphone, laptop, desktop, tablet).

By embedding the voice mail message into the generated e-mail, the recipient may be provided the ability to forward the voice mail message to other individuals. In some embodiments, the recipient can response to the voice mail message and provide further annotation and comments addressing the voice mail message to other individuals (e.g., the sender).

It should be noted that there may be other possible standard IVR commands 205. The examples provided in FIG. 2 are not intended to be exhaustive. Various IVR services associated with the voice mail system may include different and additional commands as necessary. The examples illustrated in FIG. 2 are intended to present embodiments of how IVR commands can be associated with voice mail messages.

FIG. 2 also provides some sample custom IVR commands 250. These custom IVR commands 250 may be generated by the sender via a graphical user interface (GUI). These generated custom IVR commands 250 may be saved on the sender device for future use. The custom IVR commands 250 may include sample commands that require the sender to fill in additional information (see 255-275) such as a website, file or contact information. Further details are provided below.

With custom IVR command 255, the sender may provide a hyperlink that the recipient can access upon selection of this option. The sender may provide the hyperlink to a related website that is raised in the voice mail message. Upon selection of this custom IVR command 225, presuming that the recipient's device is capable of accessing the Internet, an application (i.e. browser) may be initiated in the background processes having the corresponding webpage opened for the recipient to view. This application may also be instructed to open and display the webpage in an active window so that the recipient can immediately view the hyperlink referenced by the sender. In situations where the recipient's device is not capable of accessing the Internet (i.e. no signal), the IVR command 255 may be capable of providing the hyperlink to the recipient via text or e-mail so that the webpage can be accessed at a later date or via a different computing device having Internet access.

Custom IVR command 260 allows the sender to associate various documents (e.g., video files, audio files, Word documents, PDFs, Excel spread sheets) with the voice mail message. The sender may upload and store various documents online (i.e. cloud) with a corresponding address where the documents can be found. This custom IVR command 260 allows the recipient to download the associated documents, for example, to the recipient's device (e.g., smartphone) from the address provided by the sender. In some embodiments, the recipient may be capable of attaching the associated documents to an e-mail that can be sent to the recipient's e-mail address so that the recipient can view the associated documents later.

Custom IVR command 265 allows the sender to associate one or more phone numbers that the recipient can be prompted to call in order to follow up on the provided voice mail message. In some situations, the suggested number could be the sender's number. In other situations, the suggested number could be a different individual discussed in the voice mail message. In any case, this IVR command 265 can initiate a phone call with the suggested number automatically so that the recipient does not need to write down/recall a number that may have been raised in the voice mail message.

Custom IVR command 270 allows the sender to set up a calendar event that could be incorporated into the recipient's calendar application (if available). The sender can dictate details of the event such as the name of the event, location, time and purpose of the event. When the recipient selects this command 270, the event information can then be used to modify the recipient's calendar in order to remind the recipient of the event's occurrence. Various notifications/reminders may also be set up, for example, based on the recipient calendar settings that can be used to remind/alert the recipient when the event will occur.

Custom IVR command 275 allows the sender to provide contact information that can be incorporated into the recipient's contact listing. The sender may provide a name and various contacts (e.g., phone number, e-mail address) that the recipient can obtain by selecting IVR command 275.

Although IVR command 275 may be a custom command initially since the sender would may need to input personal contact information, it may be possible that IVR command 275 could be implemented as a standard command. Implementation of IVR command 275 into a standard command may require various processes that are directed at extracting information (e.g., sender contact information) to be used with the IVR command 275. In this way, IVR command 275 can be used with various different users (i.e. standard command). In fact, if one or more custom commands 250 are used prevalent enough, various IVR systems may incorporate such commands into standard commands 205 by incorporating various processes that extract the necessary information to carry out the IVR command.

It should be noted that the IVR commands illustrated in FIG. 2 may be provided as options to the recipient in an audio fashion whereby the recipient can input a corresponding button (e.g., number) associated with the IVR command to be executed. In some embodiments, as described below, these IVR commands may also be displayed on the display of the recipient's device (e.g., smartphone). Upon review of the available IVR commands, the user can select one or more IVR commands via recipient input (e.g., touching buttons associated with an IVR command on a touch screen display). Example embodiments are described with respect to FIG. 3.

FIG. 3 illustrates s cellphone 300 that includes the IVR system with voice mail messages. The cellphone 300 includes a voicemail system that receives and stores voice mail messages received from various senders. The received voicemails may be displayed 305 on the cellphone 300 for the recipient to view. In some embodiments, the cellphone 300 may provide notification (e.g., vibration, audio) whenever a voice mail message has been received.

As illustrated in the cellphone 300, information about the voice mail message may be included for the recipient to view. Exemplary information may include a number associated with the voice mail message, where the caller was calling from, and when (e.g., date and time) the voice mail message was left 310.

The cellphone may be capable of displaying multiple voice mail messages (if available) for the recipient to view. The recipient may then select from the multiple available voice mail messages which one the recipient would like to listen to (if any). When a particular voice mail message is selected (e.g., via a cursor, touch screen, button), additional information may be provided related to the selected voice mail message. For example, a play button with an associated time-line can be displayed 315 in order to allow the recipient to access and listen to the voice mail message. The time-line can indicate a total length of the voice mail message but also allows the recipient to skip around the voice mail message (i.e. replay sections, fast forward, rewind).

Additional options 320 may also be displayed when a particular voice mail message is selected. These additional options 320 may include enabling speaker functionality with the voice mail message (i.e. playing the voice mail message using the speakers of the cellphone 300), callback the sender (i.e. allowing the recipient to automatically dial up the sender's phone number), delete the voice mail and enable IVR functionality. Selection of these options 320 may be performed in a similar manner by the recipient as selection of a particular voice mail message to access/listen to (i.e. cursor, touch, button). The IVR functionality may only appear in voice mail messages that have IVR commands associated with them by the sender. In some embodiments, the IVR functionality option may be always present but nothing would happen unless the sender associates at least one IVR command with the selected voice mail message.

Presuming that at least one IVR command is associated with the selected voice mail message, when the recipient initiates the IVR functionality listed under the additional options 320, the cellphone 300 can then indicate to the recipient that IVR features have been accessed (i.e. title change 325). The cellphone 300 also displays, alongside the information 310 of the voice mail message with various assigned IVR commands 330. These IVR commands 330 may include standard commands or custom commands. These IVR commands 330 are associated by the sender with the voice mail message. Therefore, different voice mail messages may include less/more or different IVR commands 330 based on the sender's input.

As discussed above with FIG. 2, the recipient can select one or more IVR commands 330 in order to perform various actions (i.e. respond via e-mail, text or phone call, set reminders). The recipient may select the IVR commands 330 via a keyboard associated with the cellphone 300. In some embodiments, the cellphone 330 may include a virtual keyboard 335 that includes buttons associated with the various IVR commands 330. The recipient can select the appropriate IVR commands 330 via the virtual keyboard 335 (i.e. cursor, touch, buttons). In situations where there are more IVR commands 330 that can be displayed on the display of the cellphone 300, the IVR commands 330 may be provided in a menu or window that the recipient can view one or more IVR commands 330 assisted by scroll bar functionality already known in the art. Alternatively, a summary of the IVR commands 330 may be provided in order to save room. The recipient may obtain further details about a particular IVR command 330 by interacting (i.e. hovering a cursor, selecting the command) with the IVR command 330.

Figure 4:
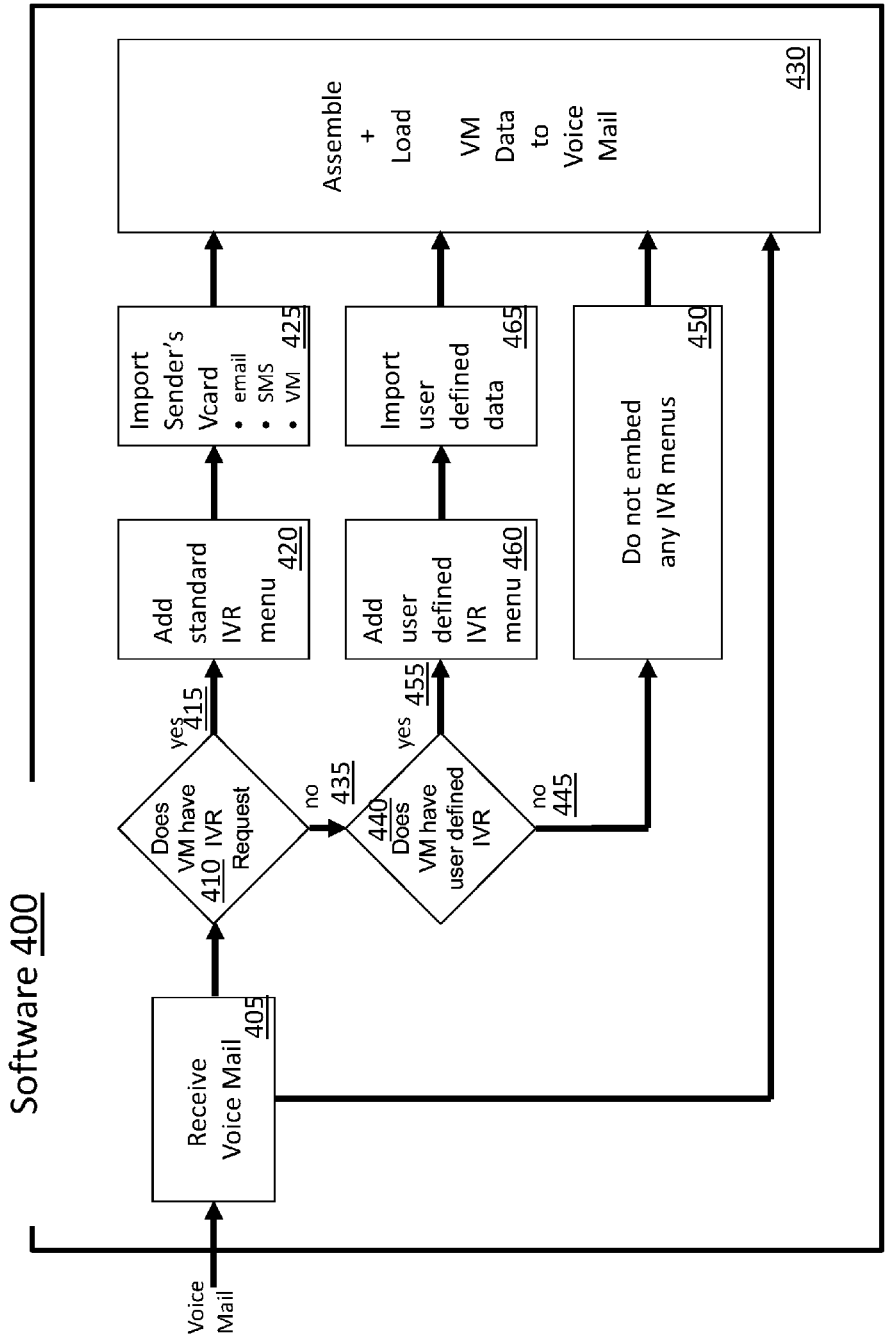
FIG. 4 illustrates IVR with Voicemail software.

FIG. 4 illustrates IVR with Voicemail software 400. The software 400 illustrated may be associated with an application run on the recipient's device (e.g., smartphone, computing device). The software 400 evaluates the IVR commands associated with the voice mail message provided by the sender and generates, for example, a display for the smartphone where the recipient can access the various available IVR commands.

In some situations, for example with a cellphone, the software 400 may be run in the cloud/Internet. The voice mail message with associated IVR commands can be transmitted by the sender and stored in the cloud/Internet. The software 400, run on the cloud/Internet, can then process the IVR commands and generate an audio-based recording (much like many of the automated systems that companies may have for customer service). When the recipient seeks to listen to the voice mail message from the sender, the audio recording can also be provided alongside the voice mail message that allows the recipient on their cellphone to access the various available IVR commands.

In step 405, a voice mail message may be received by the recipient. The voice mail message may be stored on the recipient's device (e.g., smartphone) or stored on the cloud/Internet associated with the recipient's account. A notification may be provided to the recipient that a sender has provided a voice mail message for the recipient to listen to.

In step 410, the software 400 evaluates the voice mail message in order to determine if there are any associated IVR commands provided by the sender. These IVR commands may include both standard commands and custom commands (as described above in FIG. 2). Once the software 400 determines that IVR commands are associated with the voice mail message, in step 415, the software 400 generates a menu that includes the standard IVR commands that can then be viewed (or heard) by the recipient in step 420. If any of the standard IVR commands require information from the sender (e.g., e-mail address, phone number), the software 400 retrieves the sender's information (presumably provided by the sender when setting up the IVR commands with the voice mail message). The sender's information is then incorporated into the standard IVR commands (in step 425) that are subsequently provided to the recipient (in step 430).

If no standard IVR commands were determined to be associated with the voice mail message (in step 435), the software 400 may evaluate whether custom IVR commands are present instead (in step 440). If such custom IVR commands are detected (in step 455), the software 400 can incorporate the custom IVR commands into the IVR menu that is later provided to the recipient to view/listen to in step 460.

Similar to step 425 where sender information is incorporated into the standard IVR commands, any sender provided information is also associated with the custom IVR commands in step 465. Such information may include not only similar information provided in step 425 but also include rich media content (e.g., video files, audio files, hyperlinks). Once all the necessary information has been associated with the custom IVR commands in step 465, the voice mail message alongside the IVR functionality is provided to the recipient upon request (in step 430).

If the software 400 determines (in step 435) that no standard IVR commands are present and (in step 445) that no custom IVR commands are present, the software 400 does not incorporate any IVR functionality with the voice mail message (step 450). The voice mail message is provided to the recipient to access and listen to in step 430. This situation corresponds to embodiments where IVR functionality is completely absent from the voice mail message provided by the sender.

Figure 5:
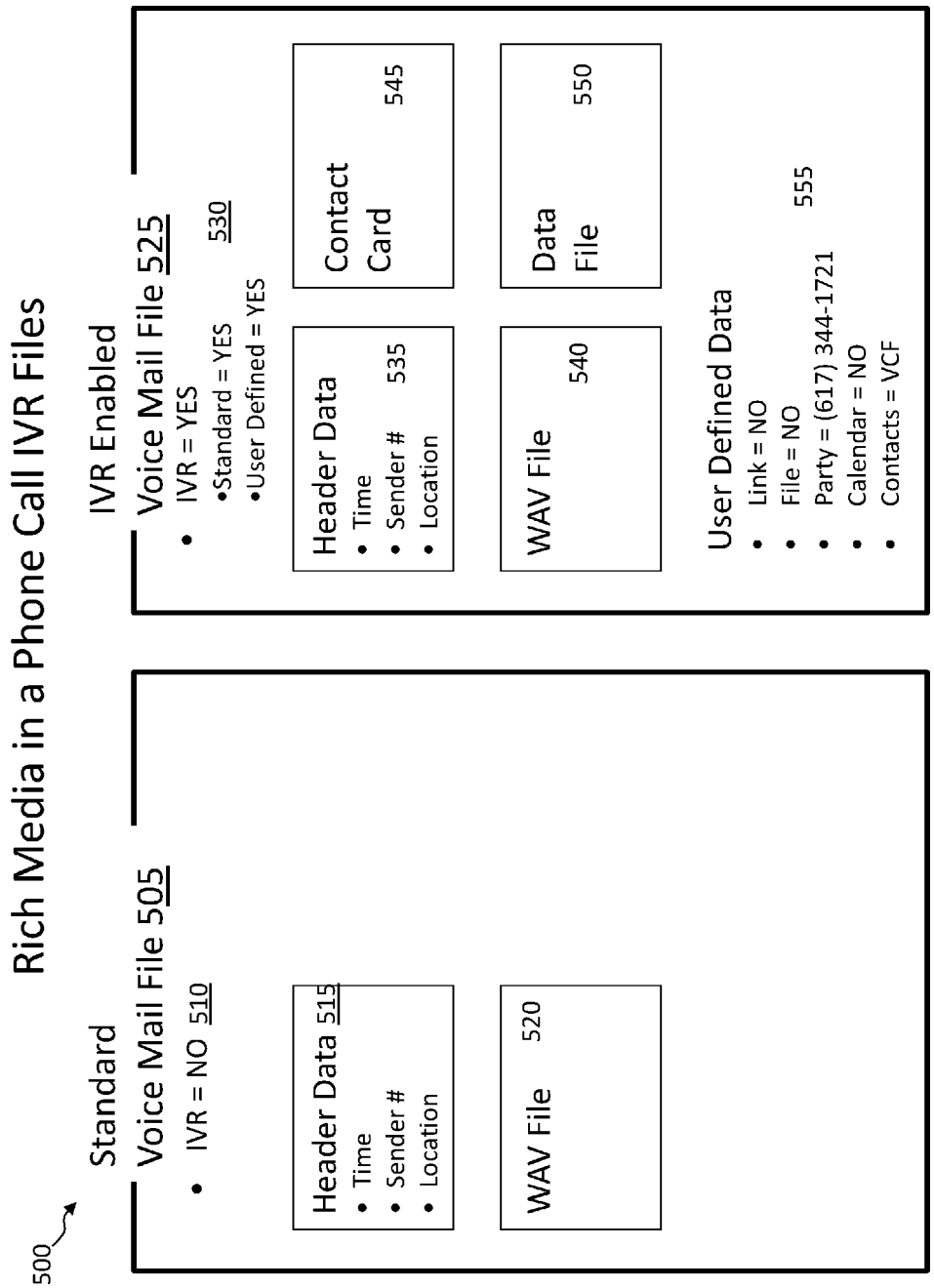
FIG. 5 illustrates exemplary graphical user interface for incorporating rich media with voice mail messages using IVR commands.

FIG. 5 illustrates a graphical user interface 500 for incorporating rich media with voice mail messages using IVR commands. In the graphical user interface (GUI) 505, a standard voice mail file is displayed. The GUI 505 indicates that there is no IVR command functionality associated with a current voice mail message. Information about the voice mail message 515 may be included in GUI 505. Such information 515 may include information about the sender, where the sender was calling from and when the voice mail message was recorded. Furthermore, a copy of the voice mail message 520 may also be accessible. In an embodiment, the copy of the voice mail message 520 may be in a .wav form that can subsequently be played on various computing devices (e.g., smartphone, laptops, desktops).

In the GUI 525, IVR commands are illustrated as being available with a current voice mail message. The GUI 525 can explicitly indicate that IVR commands are available as well as provide details as to what type of IVR commands (i.e. standard and/or custom) are available as well 530. Aside from information that can be displayed about the voice mail message (i.e. sender information, where and when the voicemail message was recorded) 535 and the audio recording file of the voice mail message 540 that are also available in GUI 505, the IVR enabled GUI 525 also includes information that can be incorporated into the IVR commands.

The GUI 525 may include information about the sender (i.e. contact card) 545. Such information may be in the form of a vCard (i.e. electronic business card) that includes information such as the name, address information, phone number, e-mail addresses and various other identification of the sender. Such information about the sender 545 may be incorporated into one or more IVR commands.

The GUI 525 also includes data files 550 that correspond to the various different types of data (i.e. rich media content). As noted above, the sender may be capable of associating various types of information such as audio files, video files, and hyperlinks. The data files 550 can be provided by the sender in relation to the voice mail message. Since the data files 550 are associated with the voice mail message, the recipient can later access and view the data files 550 if desired.

The GUI 525 may also include a summary of IVR functionality associated with the voice mail message 555. As illustrated in FIG. 5, such summary 555 may indicate whether a hyperlink, data file, phone number, calendar request or contact information has been associated with the present voice mail message. It should be noted that the summary 555 may include more, less or different features indicating associated IVR features with the voice mail message.

Figure 6:
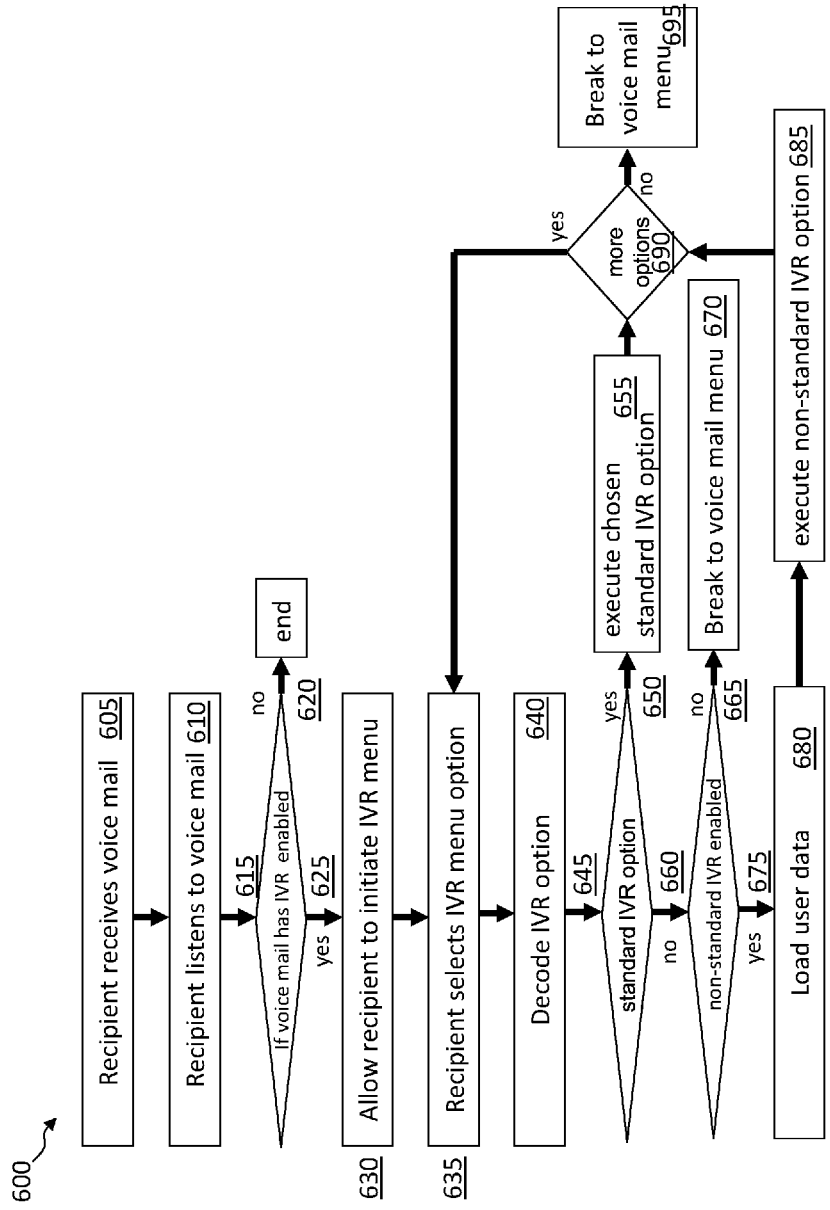
FIG. 6 is a method describing an implementation of IVR functionality with voice mail messages.

FIG. 6 is a method 600 describing an implementation of IVR functionality with voice mail messages. In step 605, a recipient receives a voicemail message from a sender. The voice mail message may be provided subsequent a sender's attempt to contact the recipient via telephone call but was unable to successfully connect with the recipient.

Prior to providing the voice mail message to the recipient, the sender may choose to associate one or more IVR commands with the voice mail message. The sender may also incorporate various data to be associated with the IVR commands as well. Once all IVR commands and/or data is associated with the voice mail message, the sender can confirm that the voice mail message is to be provided to the recipient. The voice mail message may be stored, for example, on the recipient's device (e.g., cellphone, smart-phone) or stored in the cloud or Internet.

In step 610, the recipient can chose to access the voice-mail message from the sender. This can be performed, for example, on the recipient's device by accessing a "mail box" or storage that contains all the stored voice mail messages received. In some situations, the recipient may access the voice mail messages stored in the cloud/Internet by accessing the account associated with the recipient where the voice mail messages are stored.

Once the voice mail message has been accessed by the recipient, software on the recipient's device may evaluate whether any IVR commands are currently associated with the voice mail message in step 615. If no IVR commands are detected, the voice mail message can be played by the recipient without further processing (step 620). If at least one IVR command is detected (step 625), however, an IVR menu may be generated for the recipient that includes the at least one IVR command (step 630). The IVR menu may include the list of available IVR commands that can be selected by the recipient, for example, via use of a virtual keyboard (as seen in FIG. 3).

From the IVR menu, the recipient can select one or more IVR commands in step 635. Based on the selected command, the software can decode the command in step 640 to determine what type of process is to be performed (i.e. what type of data to be provided to the recipient). The software evaluates what type of IVR command is being executed in steps 645 and 660. If a standard IVR command is detected in step 650, the software can execute the corresponding action to be performed in step 655. Similarly, if a custom IVR command is detected in step 675, the software can retrieve the appropriate sender provided data 680 to be incorporated with the executed action to be performed in step 685.

Once the software completes performing the selected IVR command 690, an evaluation can be performed to check to see if the recipient intends to select other possible IVR commands. This evaluation can be performed with the assistance of a prompt that is displayed for the recipient requesting confirmation as to whether additional IVR commands will be selected. If the recipient wishes to select other IVR commands, the method 600 loops back to step 635. Otherwise, once the recipient is finished, the software may return back to the voice mail message menu. The voice mail message menu may be an overview of all available voice mail messages.

If for some reason the selected IVR command by the recipient was not recognized in step 665 after going through all possible standard and custom IVR commands, the software may return back to the main menu in step 670. The software may also indicate to the recipient that no IVR functionality was detected and/or recognized. The voicemail message can then be provided to the recipient without any IVR functionality.

As noted above (e.g., FIG. 2) the recipient may be capable of automatically generating a new e-mail that includes various information (e.g., audio files, video files, Word documents) embedded within the e-mail. Also included with the newly generated e-mail may also be a copy of the voice mail message as an audio recording. It would be possible, described in further details below, for the recipient to incorporate the voice mail message into the generated e-mails via links. In this way, the individuals whom the recipient sends the e-mail to would be capable of accessing the voice mail message by interacting with the link. It should be noted that this feature can be generally applied to incorporate all sorts of active content (e.g., audio recordings such as voice messages) into a variety of different text-based documents (e.g., e-books, texts, e-mails.

Figure 7:
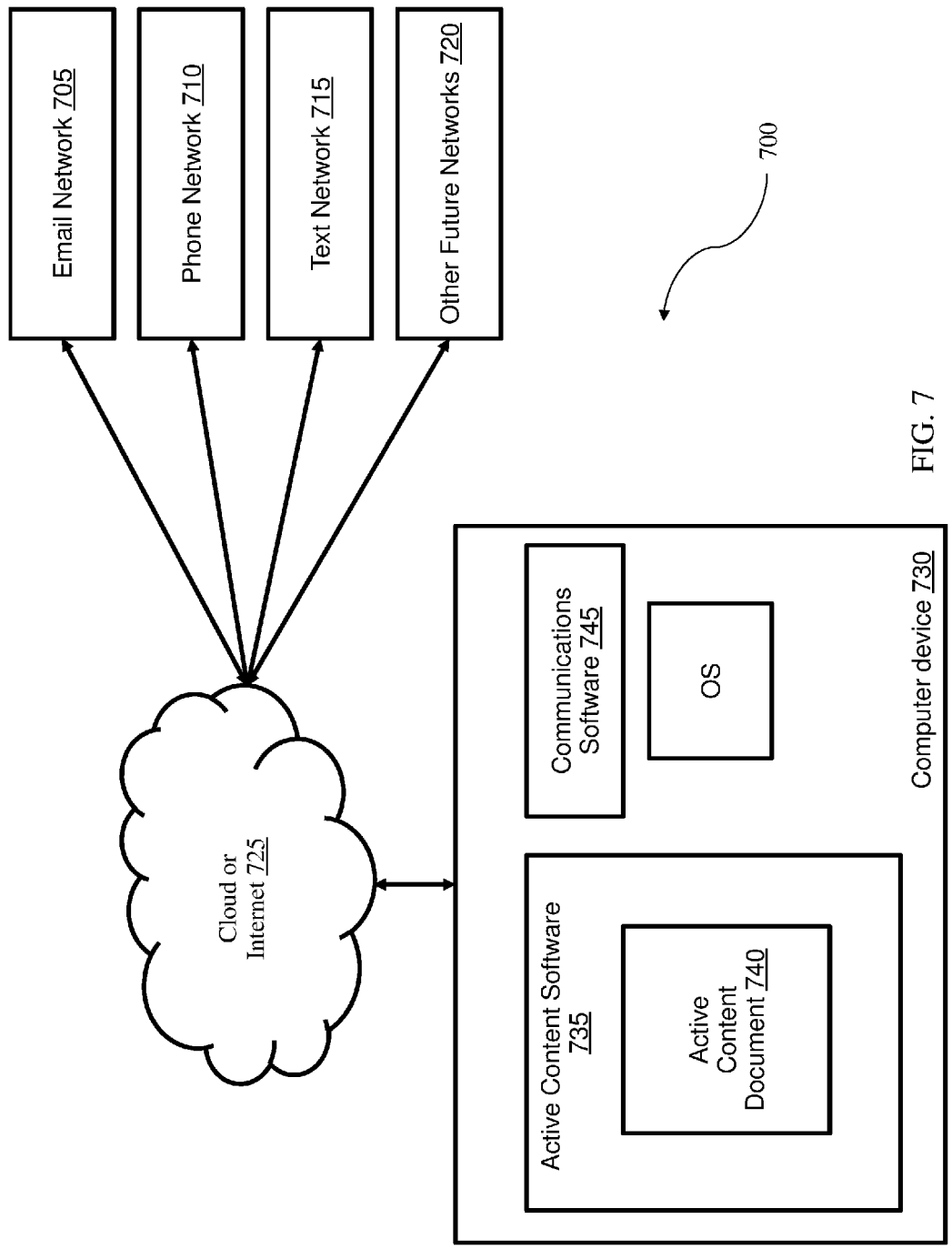
FIG. 7 illustrates a system for incorporating files (e.g., audio-based files) as active content into active content documents.

FIG. 7 illustrates a system 700 for incorporating files (e.g., audio-based files) as active content into active content documents. The active content can be included in a text-based document such as an e-mail or e-book so that a reader can access the active content and, for example, listen to the audio recording upon selecting a link embedded in the text-based document that is associated with the audio recording.

As illustrated in the figure, the system 700 may include a variety of different networks found in the cloud or Internet 725. These networks can be associated with, for example, an e-mail network (associated with user e-mails) 705, phone network (associated with user voice mail messages) 710, and a text network (associated with various text-based documents such as e-books) 715. Various other networks 720 may also be included in the system 700.

The networks 705-720 may be communicatively connected with a user device 730 via use of a communication module 745. The communication module 745 facilitates the transmission and retrieval of information (e.g., video files, audio files, text-based files) from the networks 705-720 using methods known in the art such as Wi-Fi, 3G, 4G, LTE, and Bluetooth. Through the communication module 745, information can be obtained from the various networks 705-720 for the active content software 735 to associate one or more files (e.g., voice mail messages, audio recordings) with, for example, an e-book or e-mail (i.e. active content document 740). The active content software 735 is capable of associating the audio-based files into the active content document 740 so that when a reader accesses a link referencing one or more audio-based files, the reader can then listen to the corresponding audio file obtained, for example, from the phone network 110.

Figure 8B:
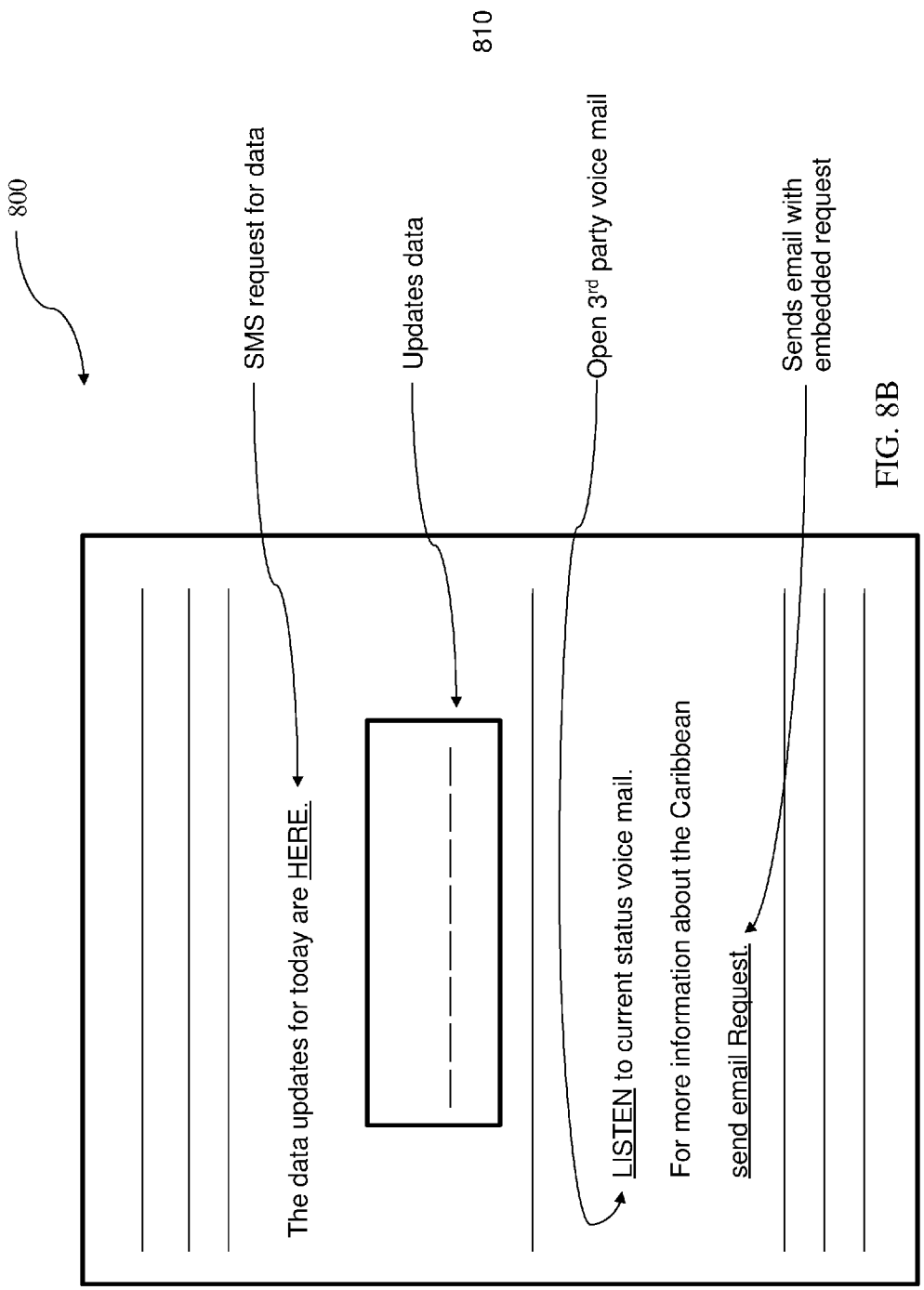

FIG. 8A and FIG. 8B illustrate example active content 800 that includes various different types of embedded content 810. At least in the example illustrated in the figure, the active content 800 is a page of an e-book. It is possible that other types of active content documents are also applicable such as e-mails and texts.

In any case, within the active content document 800 various different embedded content 810 can be found. Such embedded content 810 can be represented via a hyperlink or button that the reader can interact with in order to access the associated active content. For example, exemplary embedded content 810 includes related text messages, voice mail messages, and e-mails. Other types of active content such as audio recordings and video recordings can also be embedded into the active content document 800.

When a reader selects one or more of the embedded content 810, the active content software can obtain the corresponding document (e.g., text, voice mail, e-mail) and provide it for the reader to view. This information may be provided within a new window that is shown as a pop-up in front of the active content document, for example. Once the user is finished reading the provided embedded content 810, the user may choose to minimize or close the pop-up window and continue on reading the active content document 800.

Figure 9:
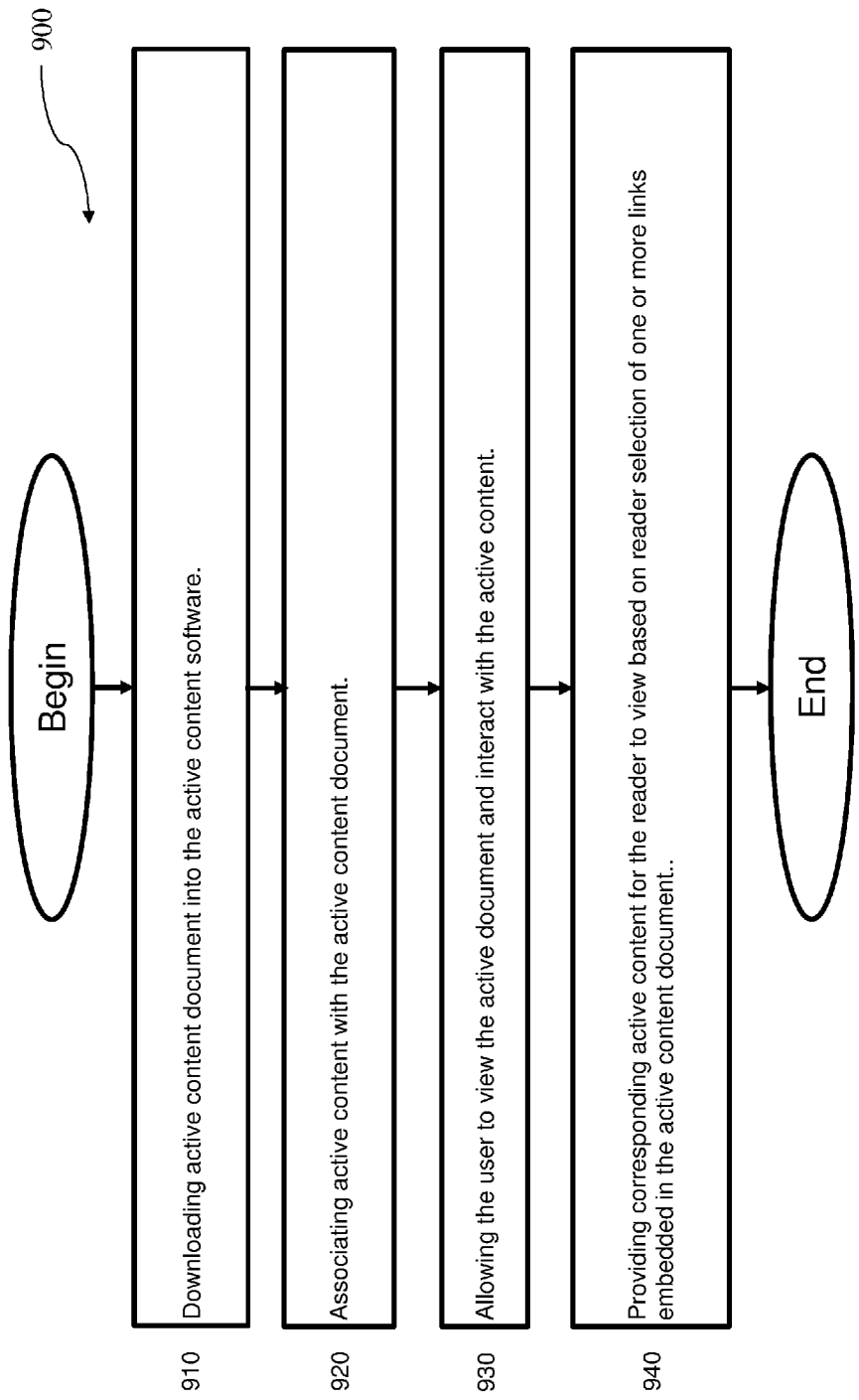
FIG. 9 illustrates a method for incorporating active content into various documents.

FIG. 9 illustrates a method 900 for incorporating active content into various documents. The use of active content in documents via links allows these documents to become more active. The reader may become more engaged or interested in the dynamics of the document. In other ways, these documents may also be further supplemented with additional information that can help provide further understanding and context to the document in an easier manner for the reader.

In step 910, the reader downloads the active content document (e.g., e-book, e-mail) for use with their user device (e.g., smartphone, tablet, laptop). The user device can include active content software directed at processing the active content links used to retrieve the active content embedded with the active content document. The active content software can process each of the active content links embedded in order to determine where the content can be retrieved from (in step 920). In some cases, the corresponding active content may be stored within the user device. In some other situations, the active content can be found, for example, on the cloud or Internet. As illustrated in FIG. 7, there may be a number of various networks that can be accessed in order to obtain the corresponding active content embedded in the active content document.

In step 930, the reader can access and read the active content document. As the reader goes through the active content document, there may be one or more links that are displayed. In some embodiments, these links may be associated with particular words or photographs associated with the active content document. An indication that these links exist (i.e. that interaction with the particular word or photo would initiate active content) may be facilitated through the use of different color text or font. The reader can interact with the link, for example, by selecting the link with a cursor or transmitting a selection via touch (if the display of the user device includes a touchscreen display).

In step 940, the active content software retrieves the corresponding active content based on the selected link. The active content that is retrieved may include various types of rich media-based content such as audio files (i.e. voice mail messages) and video files. The active content can then be displayed, for example, in an active pop-up window that allows the user to view the active content. After the active content has been viewed, the pop-up window can be closed or minimized so that the reader can continue reading the active content document.

Figure 10:
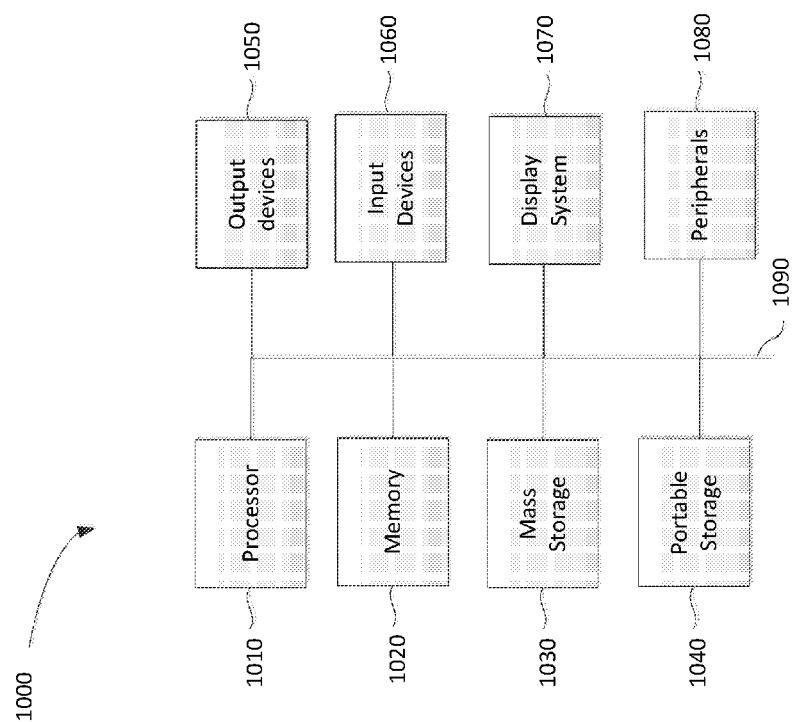
FIG. 10 is a block diagram of an exemplary computing device that may be used to implement an embodiment of the present invention.

FIG. 10 illustrates an exemplary computing system 1000 that may be used to implement an embodiment of the present invention. The computing system 1000 of FIG. 10 includes one or more processors 1010 and memory 1020. Main memory 1020 stores, in part, instructions and data for execution by processor 1010. Main memory 1020 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1020 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 1020.

Portable storage device 1040 operates in conjunction with a portable non-volatile storage medium, such as a floppy disk, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information, and processes the information for output to the display device.

Peripherals 1080 may include any type of computer support device to add additional functionality to the computer system. For example, peripheral device(s) 1080 may include a modem or a router.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 11:
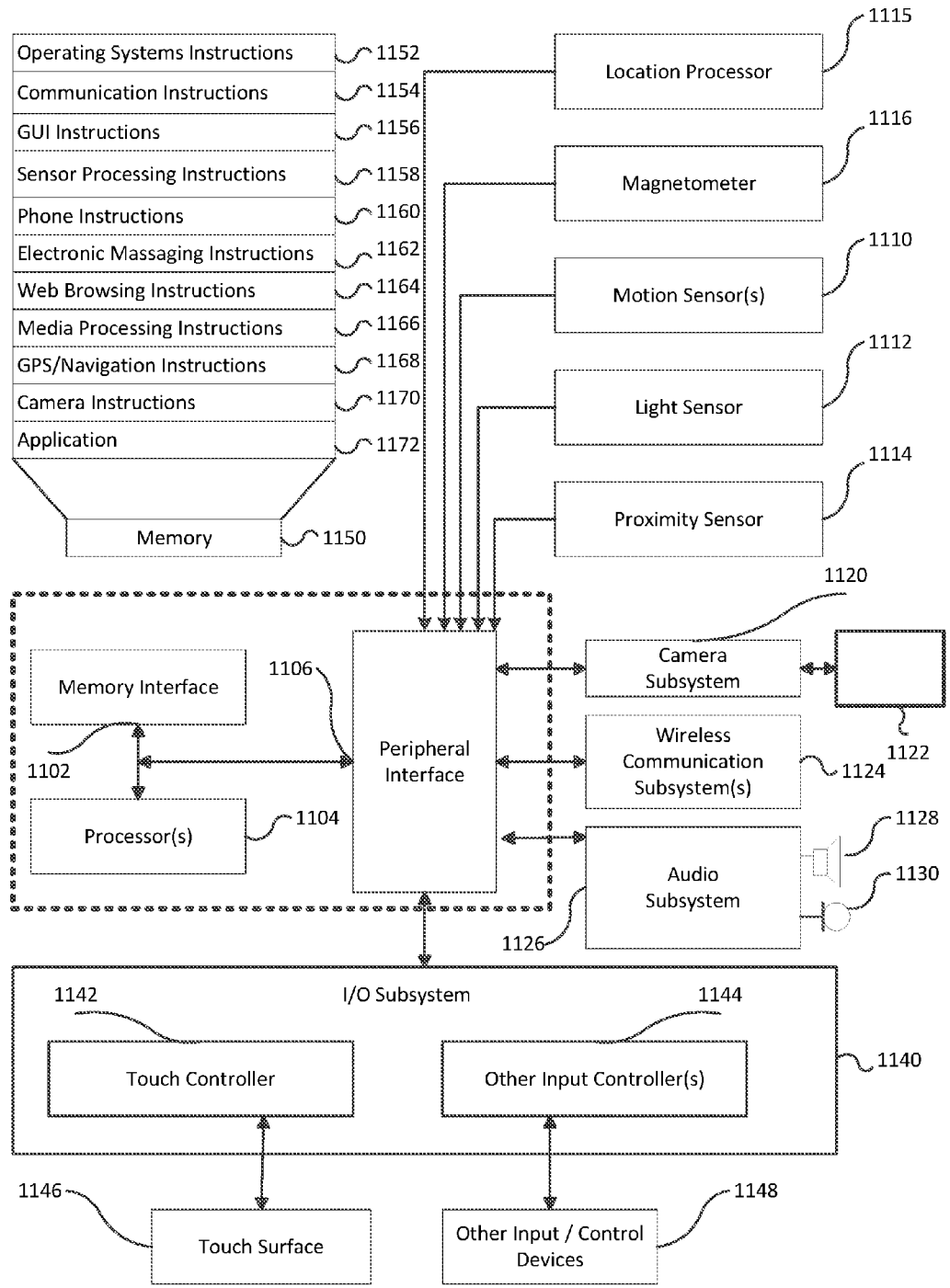
FIG. 11 illustrates a mobile device architecture.

FIG. 11 illustrates a mobile device architecture that may be utilized to implement the various features and processes described herein. Architecture 1100 can be implemented in any number of portable devices including but not limited to smart phones, electronic tablets, and gaming devices. Architecture 1100 as illustrated in FIG. 11 includes memory interface 1102, processors 1104, and peripheral interface 1106. Memory interface 1102, processors 1104 and peripherals interface 1106 can be separate components or can be integrated as a part of one or more integrated circuits. The various components can be coupled by one or more communication buses or signal lines.

Processors 1104 as illustrated in FIG. 11 is meant to be inclusive of data processors, image processors, central processing unit, or any variety of multi-core processing devices. Any variety of sensors, external devices, and external subsystems can be coupled to peripherals interface 1106 to facilitate any number of functionalities within the architecture 1100 of the exemplar mobile device. For example, motion sensor 1110, light sensor 1112, and proximity sensor 1114 can be coupled to peripherals interface 1106 to facilitate orientation, lighting, and proximity functions of the mobile device. For example, light sensor 1112 could be utilized to facilitate adjusting the brightness of touch surface 1146. Motion sensor 1110, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 1106, such as a temperature sensor, a biometric sensor, or other sensing device to facilitate corresponding functionalities. Location processor 1115 (e.g., a global positioning transceiver) can be coupled to peripherals interface 1106 to allow for generation of geo-location data thereby facilitating geo-positioning. An electronic magnetometer 1116 such as an integrated circuit chip could in turn be connected to peripherals interface 1106 to provide data related to the direction of true magnetic North whereby the mobile device could enjoy compass or directional functionality. Camera subsystem 1120 and an optical sensor 1122 such as a charged coupled device (CCD) or a complementary metal-oxide semiconductor (CMOS) optical sensor can facilitate camera functions such as recording photographs and video clips.

Communication functionality can be facilitated through one or more communication subsystems 1124, which may include one or more wireless communication subsystems. Wireless communication subsystems 1124 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 1124 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 1124 may include hosting protocols such that the device may be configured as a base station for other wireless devices. Communication subsystems can also allow the device to synchronize with a host device using one or more protocols such as TCP/IP, HTTP, or UDP.

Audio subsystem 1126 can be coupled to a speaker 1128 and one or more microphones 1130 to facilitate voice-enabled functions. These functions might include voice recognition, voice replication, or digital recording. Audio subsystem 1126 in conjunction may also encompass traditional telephony functions.

I/O subsystem 1140 may include touch controller 1142 and/or other input controller(s) 1144. Touch controller 1142 can be coupled to a touch surface 1146. Touch surface 1146 and touch controller 1142 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 1146 may likewise be utilized. In one implementation, touch surface 846 can display virtual or soft buttons and a virtual keyboard, which can be used as an input/output device by the user.

Other input controllers 1144 can be coupled to other input/control devices 1148 such as one or more buttons, rocker switches, thumb-wheels, infrared ports, USB ports, and/or a pointer device such as a stylus. The one or more buttons (not shown) can include an up/down button for volume control of speaker 1128 and/or microphone 1130. In some implementations, device 1100 can include the functionality of an audio and/or video playback or recording device and may include a pin connector for tethering to other devices.

Memory interface 1102 can be coupled to memory 1150. Memory 1150 can include high-speed random access memory or non-volatile memory such as magnetic disk storage devices, optical storage devices, or flash memory. Memory 850 can store operating system 1152, such as Darwin, RTXC, LINUX, UNIX, OS X, ANDROID, WINDOWS, or an embedded operating system such as VxWorks. Operating system 1152 may include instructions for handling basic system services and for performing hardware dependent tasks. In some implementations, operating system 1152 can include a kernel.

Memory 1150 may also store communication instructions 1154 to facilitate communicating with other mobile computing devices or servers. Communication instructions 1154 can also be used to select an operational mode or communication medium for use by the device based on a geographic location, which could be obtained by the GPS/Navigation instructions 1168. Memory 1150 may include graphical user interface instructions 1156 to facilitate graphic user interface processing such as the generation of an interface; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1168 to facilitate GPS and navigation-related processes, camera instructions 1170 to facilitate camera-related processes and functions; and instructions 1172 for any other application that may be operating on or in conjunction with the mobile computing device. Memory 1150 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1150 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for incorporating an interactive voice response system with a voice mail system, the method comprising:
    receiving a voicemail message generated by a sender for transmission to a recipient;
    associating one or more interactive voice response system commands with the received voicemail message, each command corresponds to one or more rich media content files, wherein the rich media content files include at least one of hyperlinks, video files, text-based documents, spreadsheets, and PDFs, and wherein the one or more interactive voice response system commands and the one or more rich media content files are generated by the sender;
    storing the received voice mail message, associated interactive voice response system commands, and corresponding rich media content files in memory, wherein the memory is associated with a voice mail system; and
    generating an interactive voice response menu by a recipient device of the recipient based on detection of the interactive voice response system commands, wherein the generated menu is displayed on a screen of the recipient device when the recipient accesses the voicemail message, and wherein selection of one of the commands by the recipient instructs the voice mail system to transmit the corresponding rich media content file to the recipient.

2. The method of claim 1, wherein the interactive voice response system commands further includes standard commands.

3. The method of claim 1, wherein the rich media content files also includes audio files.

4. The method of claim 1, further comprising transmitting the rich media content included in the voicemail message to a destination specified by the recipient, the transmission occurring by e-mail or text message to a storage device.

5. The method of claim 4, wherein execution of at least one of the interactive voice response system commands automatically opens a new browser window using the rich media content files associated with the voicemail message.

6. The method of claim 1, wherein the transmission of the rich-media content is provided to the recipient at a location determined by the recipient.

7. The method of claim 6, wherein the location determined by the recipient includes the recipient's email address.

8. A system for incorporating an interactive voice response system with a voice mail system, the method comprising:
    a sender device associated with a sender that generates a voicemail message for transmission to a recipient, the voice mail message transmitted to a voice mail system;
    a voice mail system that:
        receives the generated voicemail message from the sender device,
        associates one or more interactive voice response system commands with the received voicemail message, each command corresponds to one or more rich media content files, wherein the rich media content files include at least one of hyperlinks, video files, text-based documents, spreadsheets, and PDFs, and wherein the one or more interactive voice response system commands and the one or more rich media content files are generated by the sender, and
        stores the received voice mail message, associated interactive voice response system commands, and corresponding rich media content files in memory; and
    a recipient device that generates an interactive voice response menu based on detection of the interactive voice response system commands, wherein the generated menu is display on a screen of the recipient device when the recipient accesses the voicemail message, and wherein selection of one of the commands by the recipient instructs the voice mail system to transmit the corresponding rich media content file to the recipient.

9. The system of claim 8, wherein the interactive voice response system commands further includes standard commands.

10. The system of claim 8, wherein the rich media content files also includes audio files.

11. The system of claim 8, wherein the voice mail system further transmits the rich media content included in the voicemail message to a destination specified by the recipient, the transmission occurring by e-mail or text message to a storage device.

12. The system of claim 11, wherein execution of at least one of the interactive voice response system commands at the recipient device automatically opens a new browser window using the rich media content files associated with the voicemail message.

13. The system of claim 8, wherein the transmission of the rich-media content is provided to the recipient at a location determined by the recipient.

14. The system of claim 13, wherein the location determined by the recipient includes the recipient's email address.

15. A computer readable non-transitory storage medium having embodied thereon a program, the program being executable by a processor to perform a method for incorporating an interactive voice response system with a voice mail system, the method comprising:
  receiving a voicemail message generated by a sender for transmission to a recipient;
  associating one or more interactive voice response system commands with the received voicemail message, each command corresponds to one or more rich media content files, wherein the rich media content files include at least one of hyperlinks, video files, text-based documents, spreadsheets, and PDFs, and wherein the one or more interactive voice response system commands and the one or more rich media content files are generated by the sender;
  storing the received voice mail message, associated interactive voice response system commands, and corresponding rich media content files in memory, wherein the memory is associated with a voice mail system; and
  generating an interactive voice response menu by a recipient device of the recipient based on detection of the interactive voice response system commands, wherein the generated menu is displayed on a screen of the recipient device when the recipient accesses the voicemail message, and wherein selection of one of the commands by the recipient instructs the voice mail system to transmit the corresponding rich media content file to the recipient.

* * * * *